(12) United States Patent
Egan et al.

(10) Patent No.: US 7,900,087 B2
(45) Date of Patent: Mar. 1, 2011

(54) METHOD AND APPARATUS FOR CORRELATING AN OUT-OF-RANGE CONDITION TO A PARTICULAR POWER CONNECTION

(75) Inventors: Patrick K. Egan, Rochester, MN (US); Todd J. Rosedahl, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/033,982

(22) Filed: Feb. 20, 2008

(65) Prior Publication Data

US 2008/0141070 A1    Jun. 12, 2008

Related U.S. Application Data

(62) Division of application No. 11/460,787, filed on Jul. 28, 2006, now Pat. No. 7,500,120, which is a division of application No. 10/687,438, filed on Oct. 16, 2003, now Pat. No. 7,131,012.

(51) Int. Cl.
*G06F 11/00* (2006.01)

(52) U.S. Cl. .......................................... 714/14; 714/22

(58) Field of Classification Search .................. 714/14, 714/22, 23, 24; 713/300
See application file for complete search history.

(56) References Cited

U.S. PATENT DOCUMENTS

| | | | | |
|---|---|---|---|---|
| 5,381,554 A * | 1/1995 | Langer et al. | .................. | 714/14 |
| 5,781,448 A * | 7/1998 | Nakamura et al. | .......... | 700/293 |
| 5,949,974 A | 9/1999 | Ewing et al. | | |
| 6,041,414 A | 3/2000 | Kikuchi | | |
| 6,691,248 B1 | 2/2004 | Nishijima et al. | | |
| 6,735,704 B1 | 5/2004 | Butka et al. | | |
| 6,757,835 B2 | 6/2004 | Kano et al. | | |
| 6,832,324 B2 * | 12/2004 | Mullins et al. | .............. | 713/300 |
| 6,882,943 B1 | 4/2005 | Quelch | | |
| 7,036,035 B2 | 4/2006 | Allison et al. | | |
| 7,082,541 B2 | 7/2006 | Hammond et al. | | |
| 7,131,012 B2 | 10/2006 | Egan et al. | | |
| 7,152,175 B2 | 12/2006 | Madany et al. | | |
| 7,181,630 B2 * | 2/2007 | Kadoi et al. | ................. | 713/300 |
| 2003/0085624 A1 | 5/2003 | Kadoi et al. | | |
| 2004/0177283 A1 | 9/2004 | Madany et al. | | |
| 2005/0071699 A1 * | 3/2005 | Hammond et al. | .......... | 713/300 |
| 2005/0086543 A1 | 4/2005 | Manuell et al. | | |
| 2005/0088543 A1 * | 4/2005 | Yoshii | ........................ | 348/239 |
| 2006/0168191 A1 | 7/2006 | Ives | | |

FOREIGN PATENT DOCUMENTS

WO    2005/031520 A2    4/2005

OTHER PUBLICATIONS

U.S. Appl. No. 11/460,787, filed Jul. 28, 2006.
Office Action for U.S. Appl. No. 11/460,787, Dated Mar. 28, 2007.
Final Office Action for U.S. Appl. No. 11/460,787, Dated Jul. 29, 2007.

* cited by examiner

*Primary Examiner*—Dieu-Minh Le
(74) *Attorney, Agent, or Firm*—Patterson & Sheridan LLP

(57) ABSTRACT

Techniques for identifying UPS-sub-system interconnections using manual data, UPS identification signals, and variations in UPS voltage variations that produce error signals. Once interconnections have been identified an operating system can check the UPS/sub-system topology to isolate potential errors and/or to enable controlled shut-down of sub-systems in case of potential power failure.

8 Claims, 5 Drawing Sheets

| SYSTEM | POWER SUPPLY | UPS | AC LINE |
|--------|--------------|-----|---------|
| 1 | 1 | 1 | 1 |
| 1 | 2 | 2 | 2 |
| 2 | 1 | 3 | 1 |
| 2 | 2 | 4 | 2 |
| 3 | 1 | 1 | 1 |
| 3 | 2 | 3 | 1 |

METHOD AND APPARATUS FOR CORRELATING AN OUT-OF-RANGE CONDITION TO A PARTICULAR POWER CONNECTION

CROSS-REFERENCE TO RELATED APPLICATIONS

This application is a divisional of U.S. patent application Ser. No. 11/460,787, filed Jul. 28, 2006 now U.S. Pat. 7,500,120, which is a divisional of U.S. patent application Ser. No. 10/687,438, filed Oct. 16, 2003, now issued as U.S. Pat. No. 7,131,012 on Oct. 31, 2006, which are herein incorporated by reference.

BACKGROUND OF THE INVENTION

1. Field of the Invention

The present invention relates to improving the reliability of high reliability systems. More specifically, the present invention relates to identifying connections of uninterruptible power supplies to system resources.

2. Description of the Related Art

High reliability is often required in mission critical applications such as those that occur in medical, financial, communication, and military systems. Such systems can become very large and complex, involving numerous sub-systems that are integrated together by complex interconnections. For example, computer systems that process financial data can involve racks of hardware and can include hundreds of sub-systems, each with its own processors and power supplies. Another example is an Internet communication system that is comprised of numerous distributed servers. Such systems usually include a service processor that controls and integrates the individual sub-systems together under the direction of operating software.

Reliability can be so important that some systems have sub-systems with redundant power supplies that are connected to different power lines which are fed by different circuit-breakers. Other applications, e.g., communication servers, distribute user demands over distributed networks that are powered by different power lines that pass through different circuit breakers. Some applications are so critical that the different circuit-breakers are themselves powered by different power companies. When reliability is important the use of uninterruptible power supplies (UPS) is common. A UPS provides backup power in the event of an electrical outage or other power line disturbance. A UPS usually includes a battery system that powers an inverter that supplies operating power to the protected system or sub-system. The UPS can either power the system or sub-system only when a failure occurs or it can power the system or sub-system continuously with the input AC power acting as a re-charger for the batteries.

Some dual-power line systems use only one UPS that is fed from one AC power line. In such cases the other AC power line is directly connected to the other power line. In other dual-power line systems, each AC power line connects to a different UPS. Either way, to maintain reliable operation it is important to ensure that each of the redundant power supplies is powered by a different AC power source. Otherwise, the purpose of having dual-power lines is defeated. In distributed system many different sub-systems are often connected to the same UPS. If that UPS fails those sub-systems can be brought down.

What the foregoing systems have in common is a need for high reliability and the use of UPS systems to assist that reliability. However, no matter how reliable any power source is, it can fail. For example, if input power is removed from a UPS, eventually the UPS battery will fail. If dual-lines are feed from different circuit breakers powered by the same power company, the power company can fail. If different power companies are used, an electrical grid malfunction can shut-down both power companies.

While input power cannot be guaranteed, it is possible to provide controlled shut-down of systems to prevent, reduce, or mitigate problems. To improve reliability and/or to assist controlled shut-down it can be very useful to know what system resource is being powered by any particular USP system. Then, when that UPS has a problem or signals that a power failure may occur the service processor can perform a controlled shut-down of impacted resources. Unfortunately, determining what system resource is connected to a particular UPS becomes increasingly difficult as the number of UPS and system resources increase and as the system become more and more distributed. Complicating the problem is the desirability of determining which system resource is ultimately connected to a particular AC power line in a dual-line system. Further complicating the problem is providing sufficient time for a system to perform a controlled shut-down of system resource prior to power failure.

Therefore, techniques of identifying which system resource is connected to which UPS would be useful. Information that can be used to ensure that redundant power supplies are operatively connected to different UPS devices and to different AC power lines also would be beneficial. Also beneficial would be techniques of determining which system resources are powered by which UPS and which AC input line. Also beneficial would be a method of ensuring that sufficient notice is given before a particular system resource fails to provide for a controlled shut-down.

SUMMARY OF THE INVENTION

The principles of the present invention provide for methods and apparatuses that determine which system resources are connected to which UPS, and possibly which UPS is connected to which AC power line. The determined information can be used to ensure that redundant power supplies are operatively connected to different UPS systems and to different AC power lines. That information can also be used to determine which system resources are powered by which UPS, and possibly which AC input line. This enables a controlled shutdown of system resources, such as by shifting operating loads, can be provided when a UPS signals that a power failure is possible.

In one embodiment of the present invention, a user prepares a configuration file that describes the interconnections of the UPS system with the system resources. The operating system can check the configuration file for redundancy errors to ensure that redundant power supplies are not connected to the same UPS and/or AC power line. The operating system could also check to determine which system resource is connected to which UPS. Then, when a UPS signals that a power failure may occur the system can reference the configuration file to determine how to perform a controlled shutdown of system resources to mitigate damage.

In another embodiment, a UPS sends identifying information, such as an IP address or serial number, on an input AC power line. The identifying information is subsequently detected by the sub-system or service processor, which then checks to ensure that redundant power supplies are not connected to the same UPS and/or to enable a controlled shut-down of system resources.

In another embodiment of the present invention, a service processor includes power microcode that controls the output voltage of each UPS. That power microcode then directs a particular UPS to raise or lower its output voltage. The sub-systems include voltage triggers that signal when UPS power is out-of-range. When the particular UPS achieves an out-of-range condition the sub-system or service processor detects the out-of-range signals and identifies the sub-system/UPS interconnection topology. Checks can then be made to ensure that redundant power supplies are not both out-of-range, and thus are both not connected to the particular UPS, or a configure table is generated in which specific UPS systems are associated with specific system resources. Then, when a UPS signals a potential power failure the system can take steps to provide a controlled shutdown of system resources that are associated with the failing UPS.

In another embodiment, a service processor includes power microcode that directs a particular UPS to turn off its output. When the particular UPS turns off the power to a sub-system the service processor detects the OFF condition and checks to ensure that redundant power supplies are not both OFF, and thus both are not connected to the particular UPS. Alternatively, a configure table is generated in which specific UPS systems are associated with specific system resources. Then, when a UPS signals a potential power failure the system can take steps to provide a controlled shutdown of system resources that are associated with the failing UPS.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The principles of the present invention provide for methods and apparatuses that improve system reliability by identifying UPS-sub-system interconnections. This enables protecting the system against UPS connection problems. In systems that use redundant power supplies, the UPS-sub-system interconnections are checked to ensure that each redundant sub-system power supply is operatively connected to a different UPS, and possibly to a different AC power line. In systems having distributed sub-systems, the sub-system-UPS connections are identified to determine which UPS is connected to which sub-system. Once such information is available the system can perform a controlled shutdown of system resources in the event of a UPS failure.

Figure 1A:
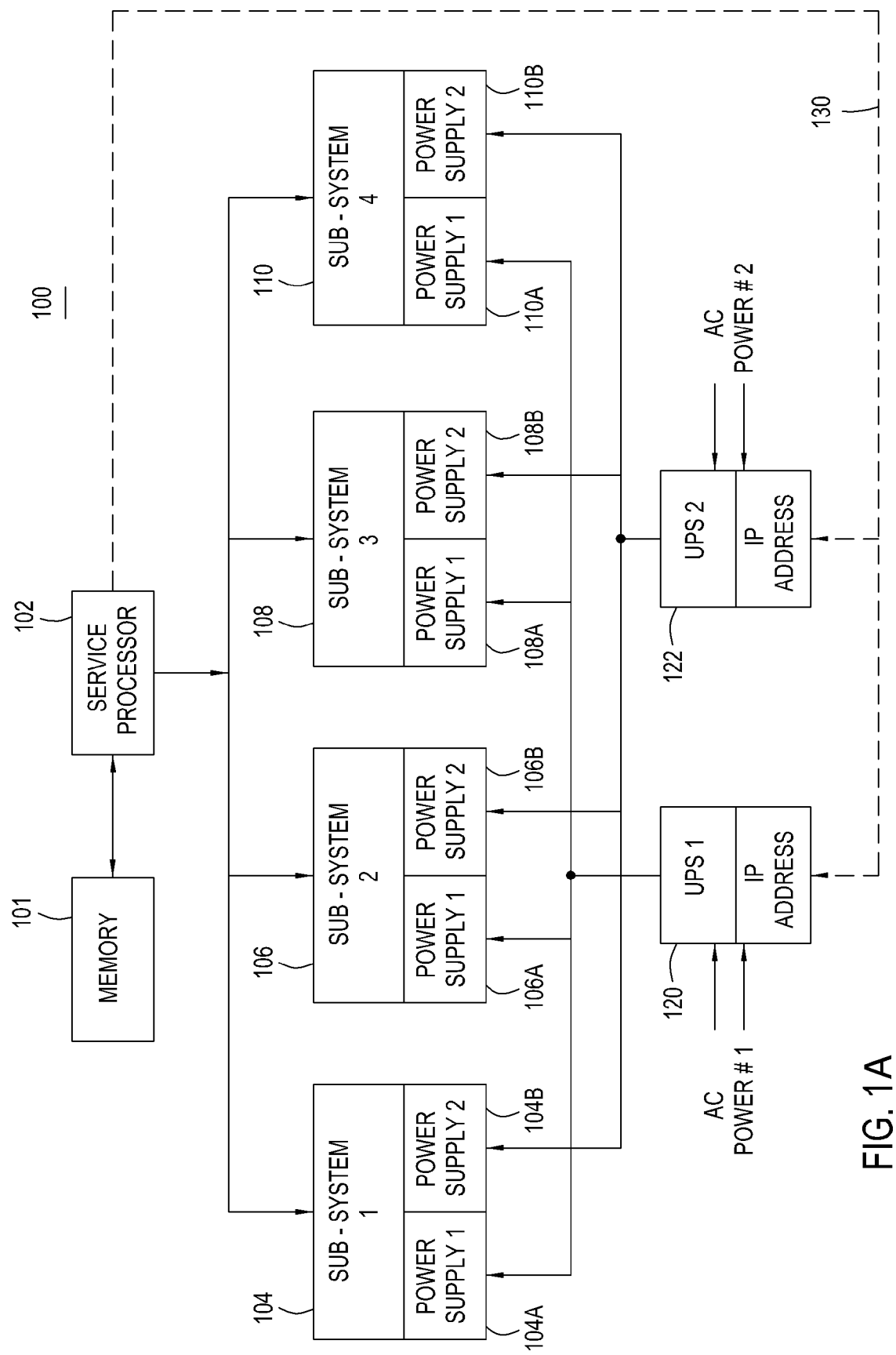
FIG. 1A is a schematic depiction of a high reliability system having sub-systems with redundant power supplies and multiple UPS devices powered from different AC power lines.

FIG. 1A is a schematic depiction of a first embodiment high reliability system 100 that is suitable for practicing the present invention. The system 100 includes numerous sub-systems, each of which includes a redundant power supply. The system 100 includes a service processor 102 that controls and monitors the overall operation of the system 100. The service processor 102 is operated by software that is stored in memory 101 and that implements the overall purpose of the system 100. As the present invention relates to ensuring the integrity of the system power, part of that software, referred to herein as power micro-code, will be specifically discussed.

The system 100 includes a plurality of N (an integer) sub-systems, illustrated by the subsystems 104, 106, 108, and 110, each of which includes two power supplies, labeled 104A-104B through 110A-110B. Each power supply can individually power its associated sub-system, e.g., the power supply 106A can completely power the sub-system 106. Thus, the pairs of power supplies 104A-104B through 110A-110B are redundant in that only one needs to operate.

Still referring to FIG. 1A, each power supply is powered by an uninterruptible power supply UPS. As shown, the system 100 has two UPS supplies, a UPS 120 and a UPS 122. One power supply of each subsystem is powered by UPS 120 while the other power supply is powered by UPS 122. The UPS 120 receives its power from AC power line #1 while the UPS 122 receives its power from the UPS power line #2. Since each power supply is connected to a UPS, and since each UPS is connected to an AC power line, each power supply is operatively connected to an AC power line. This is because an AC power line sources operating power even though a UPS comes between the AC power line and a power supply. While FIG. 1 shows only 2 UPS, some systems may have only one UPS while others may have three or more, possibly many more. An example of a system with more than two UPS is illustrated in FIG. 3. Additionally, while FIG. 1 shows only two AC power lines, some systems may use three or more. What is important is that the power supplies of a particular sub-system are ultimately powered from different AC power lines. The overall goal is to ensure that a failure of one AC power line does not cause both power supplies of a sub-system to fail (thus preserving their redundant status).

In the system 100 the service processor 102 can send power microcode commands via bus 130 to each UPS. That code controls the operation of each UPS. Also, each UPS has a discrete IP address or other identifier, such as a serial number, that can uniquely identify the UPS address, and the ability to send that identifier to the system 100.

Figure 1B:
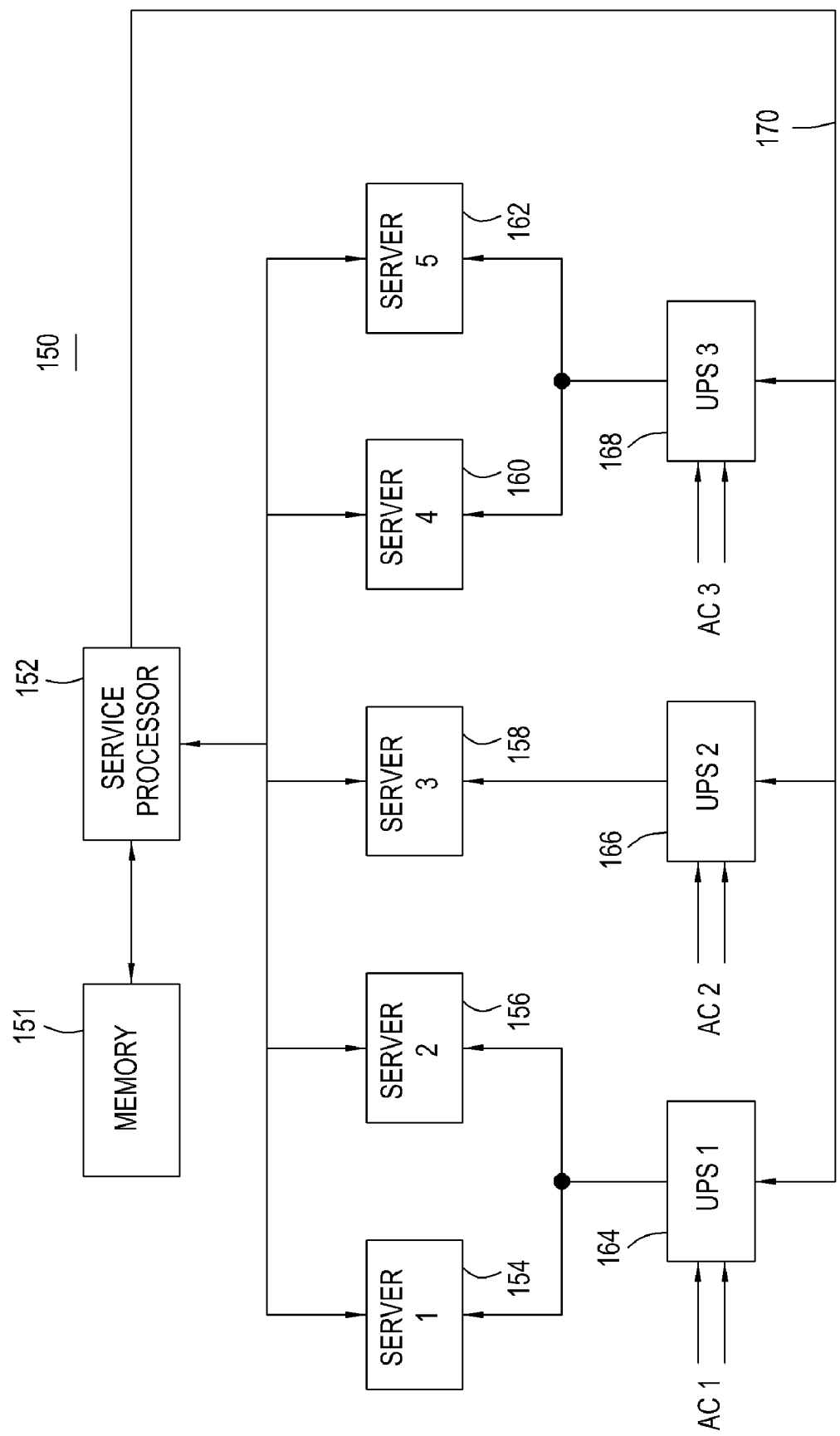
FIG. 1B is a schematic depiction of a high reliability system having distributed sub-systems and multiple UPS devices powered from different AC power lines.
Figures 2, 3:
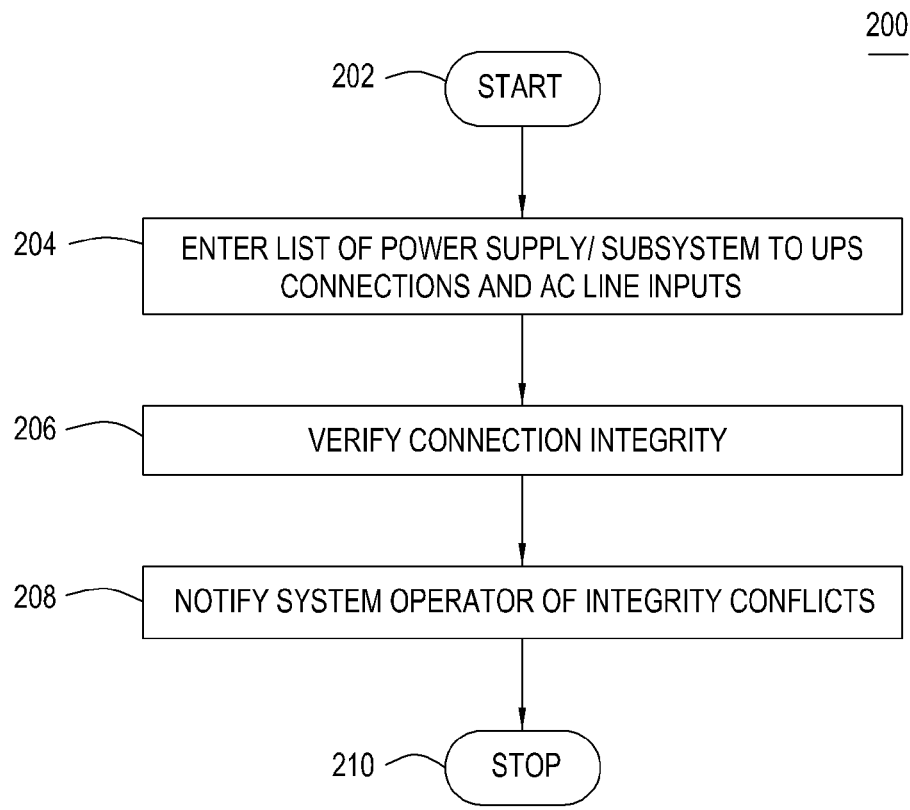
FIG. 2 is a flow diagram of a first process for checking the integrity of the power supplies and of the UPS systems.
FIG. 3 illustrates a data table suitable for implementing the principles of the present invention.

FIG. 1B is a schematic depiction of a second embodiment high reliability system 150 that is suitable for practicing the present invention. The system 150 includes a plurality of distributed subsystems which are not all connected to the same UPS system or to the AC input line. As shown, the system 150 includes a service processor 152 that controls and monitors the overall operation of the system 150. The service processor 152 is controlled by software that is stored in memory 151 and that implements the overall purpose of the system 150. As the present invention relates to identifying the interconnections of the UPS devices and sub-systems, part of that software, referred to herein as power micro-code, will be specifically discussed.

The system 150 includes a plurality of N (an integer) sub-systems that are illustrated by the servers (1-5), which are identified as server devices 154, 156, 158, 160, and 162. Each server device handles communications with a plurality of users. The server devices 154, 156, 158, 160, and 162 connect to uninterruptible power supplies UPS1, UPS2, and UPS3, which are identified as UPS devices 164, 166, and 168. The UPS device 164 receives its input power from AC power line #1, UPS device 166 receives its input power from AC power line #2, and UPS device 168 receives its input power from AC power line #3. Since each server is connected to a UPS, and since each UPS is connected to an AC power line, each server is operatively powered by an AC power line.

In the system 150 the service processor 152 can send power microcode commands via bus 170 to each UPS device that controls the operation of each UPS. Also, each UPS device has a discrete IP address or other identifier, such as a serial number, that uniquely identifies the UPS device. Each UPS device also includes the ability to send that identifier to the system 150.

FIGS. 1A and 1B illustrate two useful embodiments of the present invention: redundant power supply systems and distributed systems, respectively. However, other systems also will be able to make use of the principles of the present invention. Those principles include determining which sub-system is connected to which UPS, and possibly which UPS is connected to which AC power line.

FIG. 2 illustrates a first process 200 for verifying and identifying the UPS connections to the sub-systems or to the sub-system power supplies. Again, the overall purpose is to determine which UPS powers which system resource. Such information enables the system to ensure that each redundant subsystem power supply is ultimately powered by different AC power line/UPS, or to enable a controlled shutdown of system resources in the event of power failure. As shown in FIG. 2, the process 200 starts at step 202 and proceeds, at step 204, with a manual entry of a listing of power supplies/subsystems to UPS connections and their connections to AC power lines. An exemplary data table 300 for such a listing when considering redundant power supplies is shown in FIG. 3. That data table is stored in memory 101 (see FIG. 1A) or in memory 151 (FIG. 1B). In the system 100, after listing, at step 206, the power microcode checks the table to verify power integrity by ensuring that each sub-system has power supplies that eventually connect back to different AC power lines. If not, at step 208 the system operator is notified of a power integrity conflict. Then, at step 210, the method 200 stops.

A similar method is used when determining which sub-system is powered by which UPS/AC power line. In that case, if a UPS signals a potential failure the server 152 can perform a controlled shutdown of sub-systems that might fail. For example, in FIG. 1A, if the UPS device 166 signals that UPS 2 might fail, the service processor 152 can switch user communications from server 3 (server device 158) to server 2 (server device 156) before UPS 2 (UPS device 166) actually fails. Thus, a tabular listing of sub-system/UPS/AC power line connections can enable a controlled shutdown of sub-systems in time to prevent loss of service.

Referring now to FIG. 3, the data table 300 shows sub-systems 1 and 2 having power supplies that are driven by different UPS devices (note that FIG. 3 lists four UPS devices), and that the power supplies for sub-systems 1 and 2 connect to different AC lines. However, while sub-system 3 has power supplies driven by different UPS devices, those UPS devices are powered by the same AC line. This represents a fault condition and a warning (illustrated by highlighting) is provided to the system operator.

Figure 4:
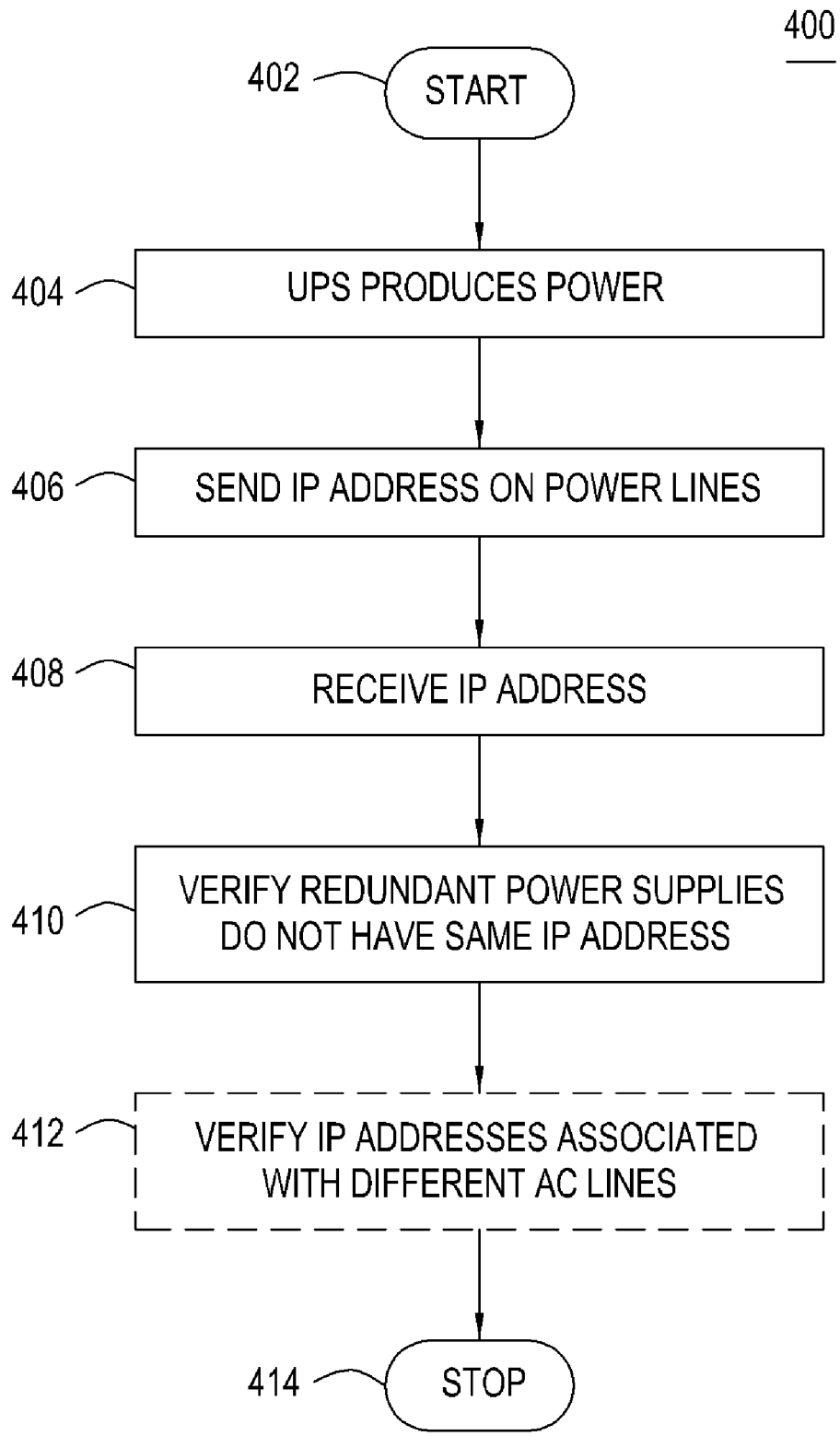
FIG. 4 is a flow diagram of a second process for checking the integrity of the power supplies and of the UPS systems.

While manual entry of information is useful, as a system becomes larger and more complex, the manual entry method becomes increasing susceptible to errors. FIG. 4 illustrates a second process 400 for identifying which UPS is connected to which system resource. Again, this information can be used to ensure power system integrity of UPS connections with sub-system power supplies.

As shown in FIG. 4, the process 400 starts at step 402 and proceeds, at step 404, by having all of the UPS devices produce power. At step 406, the UPS devices send their individual IP addresses (or other identifier) on their power lines to the various power supplies (server devices) that they drive. Sending such data can be accomplished using RF modulated signals that are capacitive coupled to the power lines. At step 408, the power supplies/subsystems/service processors receive the IP address by stripping the IP address from the power supply lines. Again, this can be accomplished by capacitive de-coupling of the RF modulated signals from the power lines. Then, at step 410, the individual sub-system or the service processor identifies which UPS connects to which system resource. If appropriate, at optional step 412, verification is made that the IP addresses, and thus the UPS devices are associated with different AC power lines. This requires some prior knowledge about which UPS is connected to which AC power line. This knowledge can be physically entered into the system. Finally, at step 414, the method stops.

If the method of sending UPS device identifiers is used with the system 150 shown in FIG. 1B, step 410 can be skipped, and the UPS-to-server information can be automatically stored. Then, if a UPS power failure is signaled by a particular UPS the service processor 152 can provide for a controlled shut-down of servers powered by the UPS that may fail, such as by switching communications to other servers.

Figure 5:
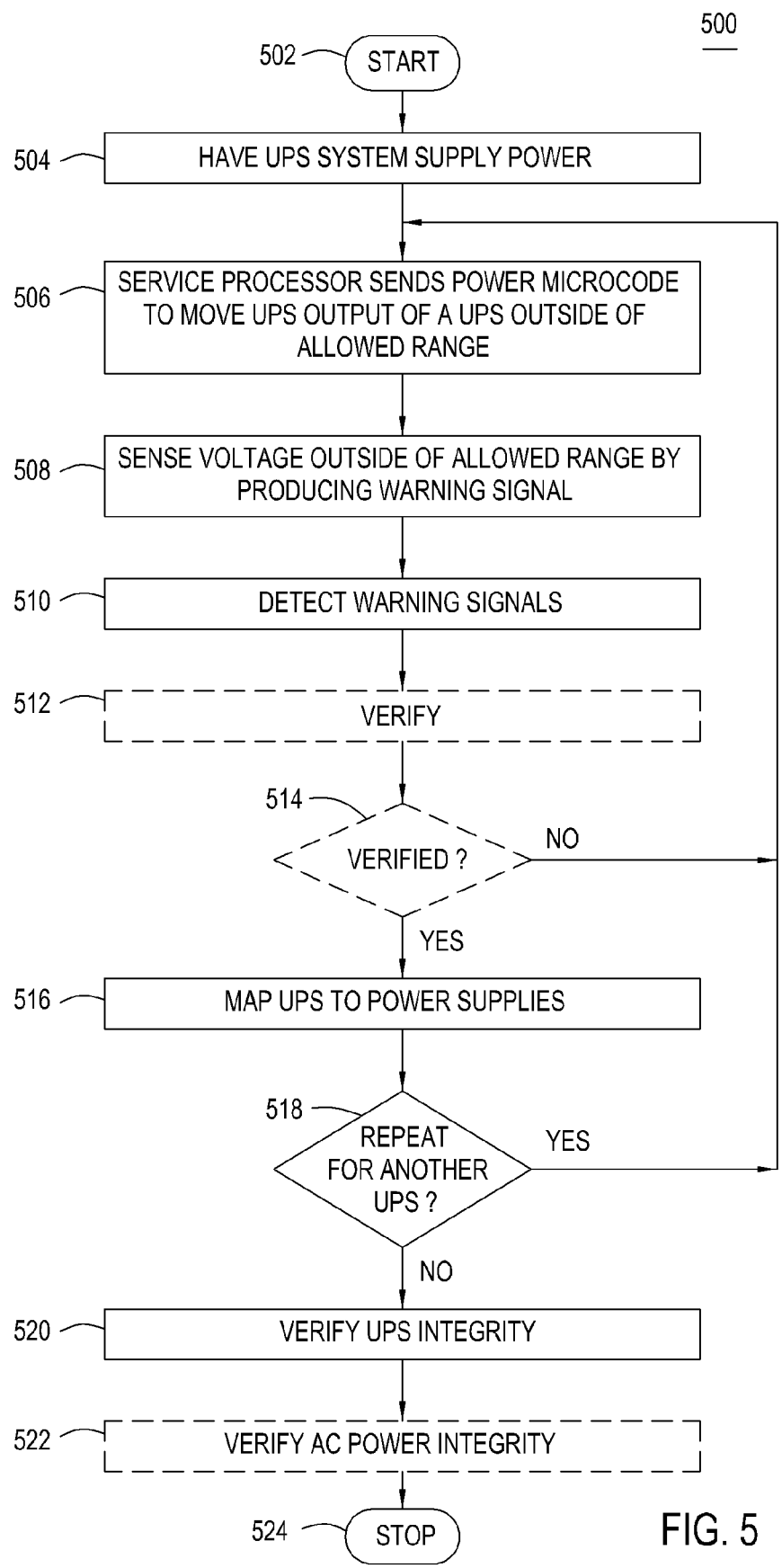
FIG. 5 is a flow diagram of a third process for checking the integrity of the power supplies and of the UPS systems.

While the method 400 beneficially provides for automated determination of which power supply/server is powered by which UPS, thus enabling automated power integrity verification, the method requires both identification information and stripping of that information from the power supply input lines. While not technically difficult to do, the method 400 requires additional hardware and special UPS supplies. FIG. 5 illustrates a process 500 that uses commonly available UPS control lines. Such common control lines enable control of UPS output voltages. Other lines enable the UPS to signal systems that a power failure can be anticipated (such as when a UPS battery is starting to achieve a high discharge state). Again, the overall purpose is to ensure that information regarding which sub-system/power supply is powered by which UPS/AC power line. The process 500 starts at step 502 and proceeds, at step 504, by having all of the UPS devices produce power. At step 506, the service processor (102 or 152) sends power microcode to a selected UPS device that causes that selected UPS device to move its output voltage outside of an allowed range (either higher or lower, including OFF).

Then, at step 508, the out-of-range condition is sensed. This is commonly done by incorporating a circuit in each sub-system/power supply that produces a warning signal when a UPS device applies voltage outside of the allowed range. At step 510, the sub-system or the service processor determines which power supply/server has produced a warning. In practice, an optional verification step, step 512, may be useful in ensuring that a warning is not being produced in the normal course of events. For example, the service processor might change the power microcode to cause the UPS to apply a voltage within the allowed range. If the warning is being produced in the normal course of events, the warning will remain. If the warning is caused by the power microcode the warning will terminate. If the warning is not verified at step 514 the process beneficially loops back to step 506 for a repeat of the process.

However, if the warning is verified, at step 516 the service processor maps the UPS to the servers/power supplies having warnings. If there are other UPS devices to be mapped, at step 518, the process loops back to step 506 for the selection of another UPS. However, if there are no other UPS devices to be mapped, at step 520, the service processor verifies the UPS integrity. That is, the service processor checks that each power supply of a sub-system is powered by a different UPS device. Then, at step 522, an optional verification is made to ensure that the UPS devices that power each sub-system are not connected to the same AC power line. If either step 520 or step 522 fail, signaling a lack of power integrity, a warning is provided to the system or to the system operator. Then, at step 524, the process stops.

A useful feature of the systems 100 and 150 is the provision for automatic shutdown. While the UPS devices 120 and 122 (and 164-168) are powered by different AC power lines, it is possible for all power lines to simultaneously fail. In that case, warnings can be created by the different UPS devices that signal AC power failures can be anticipated. When the service processor (102 or 152) determines that a sub-system is in danger of failure the operating software provides for a controlled shut down of the sub-system or sub-systems at risk. This can be performed in such a way that problems caused by the failure can be prevented or mitigated.

While the foregoing is directed to embodiments of the present invention, other and further embodiments of the invention may be devised without departing from the basic scope thereof, and the scope thereof is determined by the claims that follow.

What is claimed is:

1. A system comprising:
   a service processor controlled by operating software;
   an uninterruptible power supply (UPS) for supplying AC power and UPS identifying information on a power connection; and
   a plurality of system resources for sensing said identifying information and for sending said identifying information to said service processor;
   wherein said service processor receives and examines identifying information to determine which of the plurality of system resources is connected to said UPS; and wherein said UPS notifies said service processor of an impending power failure, and wherein said service processor performs a controlled shutdown of system resources connected to said UPS in response to said notification.

2. A system according to claim 1 wherein said identifying information is an IP address.

3. A system according to claim 1 wherein said identifying information is a serial number.

4. A system according to claim 1, wherein at least one system resource includes redundant first and second power supplies, and wherein said service processor determines if said first and second power supplies are both connected to said UPS.

5. A system according to claim 4, wherein said service processor initiates a warning if said UPS connects to both said first and second power supplies.

6. A method for monitoring, by a service processor, one or more system resources and a UPS, comprising:
   receiving, by the service processor, identifying information of each of the one or more system resources;
   examining the identifying information; and
   determining, on the basis of at least the examined identifying information, which of the one or more system resources are connected to the UPS; wherein determining which system resources are connected to the UPS comprises:
   sending power microcode by the service processor;
   in response to receiving the power microcode, moving output of the UPS outside of an allowed range;
   detecting by one or more power supplies the output out of the allowed range; and
   mapping the UPS to the one or more power supplies.

7. A method for monitoring, by a service processor, one or more system resources and a UPS, comprising:
   powering on the UPS;
   powering on the one or more system resources;
   sending, by the one or more system resources, identifying information of each of the one or more system resources to the service processor;
   receiving, by the service processor, the identifying information;
   examining the identifying information; and
   determining, on the basis of at least the examined identifying information, which of the one or more system resources are connected to the UPS;
   wherein determining which system resources are connected to the UPS comprises:
   sending power microcode by the service processor;
   in response to receiving the power microcode, moving output of the UPS outside of an allowed range;
   detecting by one or more power supplies the output out of the allowed range; and
   mapping the UPS to the one or more power supplies.

8. The method of claim 7, wherein the identifying information is sent over an AC power line.

* * * * *